US012553499B2

(12) United States Patent
Thomas et al.

(10) Patent No.: US 12,553,499 B2
(45) Date of Patent: Feb. 17, 2026

(54) LINEAR ACTUATOR

(71) Applicant: MOOG WOLVERHAMPTON LIMITED, Wolverhampton (GB)

(72) Inventors: Glynn Thomas, Penkridge (GB); Paul Buttery, Newport (GB)

(73) Assignee: Moog Wolverhampton Limited, Wolverhampton (GB)

( * ) Notice: Subject to any disclaimer, the term of this patent is extended or adjusted under 35 U.S.C. 154(b) by 0 days.

(21) Appl. No.: 19/114,085

(22) PCT Filed: Sep. 21, 2023

(86) PCT No.: PCT/GB2023/052444
§ 371 (c)(1),
(2) Date: Mar. 21, 2025

(87) PCT Pub. No.: WO2024/062249
PCT Pub. Date: Mar. 28, 2024

(65) Prior Publication Data
US 2026/0002580 A1   Jan. 1, 2026

(30) Foreign Application Priority Data

Sep. 23, 2022 (GB) ..................... 2213934

(51) Int. Cl.
*F16H 25/20* (2006.01)
*B64C 13/50* (2006.01)

(52) U.S. Cl.
CPC ........... *F16H 25/205* (2013.01); *B64C 13/50* (2013.01); *F16H 25/2015* (2013.01);
(Continued)

(58) Field of Classification Search
CPC .............. F16H 25/205; F16H 25/2056; F16H 25/2021; F16H 2025/2081; B64C 13/50
See application file for complete search history.

(56) References Cited

U.S. PATENT DOCUMENTS 5,092,539 A   3/1992  Caero
7,682,045 B2 *  3/2010  Pfister ..................... H02K 7/06
                                                                310/20

(Continued)

FOREIGN PATENT DOCUMENTS

CN  107612205 A  1/2018
CN  107725705 B  2/2018

*Primary Examiner* — Joshua D Huson
*Assistant Examiner* — Peter A Taraschi
(74) *Attorney, Agent, or Firm* — Hodgson Russ LLP

(57) ABSTRACT

A linear actuator (100) comprising a stroke axis (102), an actuator rod (104) extending along the stroke axis. The actuator rod comprises: an actuator rod outer surface (110), and a first screw thread (108) on a portion of the actuator rod outer surface; a sleeve (118) positioned around, and coaxial with, the actuator rod. The sleeve comprises: a sleeve inner surface (122), a sleeve outer surface (130), a second screw thread (120) on a portion of the sleeve inner surface, the second screw thread configured to engage with the first screw thread, and a third screw thread (128) on a portion of the sleeve outer surface. A screw nut (136) is provided configured to engage with the third screw thread. At least one motor (142a, 142b) configured to drive the screw nut. In use, the at least one motor applies a torque to the sleeve via the screw nut. When the applied torque is below a threshold value, the sleeve is restricted from rotating about the stroke axis, such that rotation of the screw nut causes linear displacement of the sleeve and actuator rod together along the stroke axis. When the applied torque equals or exceeds the threshold value, the sleeve is able to rotate about the stroke axis, such that rotation of the screw nut causes rotation of the sleeve, and such that rotation of the sleeve causes linear displacement of the actuator rod.

13 Claims, 9 Drawing Sheets

(52) U.S. Cl.
CPC ..... *F16H 25/2021* (2013.01); *F16H 25/2056* (2013.01); *F16H 2025/2081* (2013.01)

(56) References Cited

U.S. PATENT DOCUMENTS

| | | | |
|---|---|---|---|
| 9,689,480 B2* | 6/2017 | Van Mil | ................... G09B 9/14 |
| 2009/0021092 A1 | 1/2009 | Elliott et al. | |
| 2011/0226075 A1 | 9/2011 | Nguyen et al. | |
| 2015/0097455 A1 | 4/2015 | Ueyama et al. | |
| 2016/0312867 A1 | 10/2016 | Larson et al. | |
| 2019/0277379 A1 | 9/2019 | Kim et al. | |
| 2021/0276850 A1 | 9/2021 | Lombardo et al. | |
| 2022/0145968 A1* | 5/2022 | Davies | ................ F16H 25/2261 |

* cited by examiner

LINEAR ACTUATOR

FIELD OF INVENTION

The present invention relates to linear actuators, for example, electromechanical linear actuators for use in aerospace and other applications. More particularly, the present invention relates to linear actuators tolerant to jam failure modes.

BACKGROUND

Traditional flight control systems use hydraulic actuators. Flight control actuators are typically required to be fail operative, i.e., they remain operational in the event of single failures. This is typically achieved by either two actuators on a flight control surface, or a dual redundant actuator. In either case if one actuator/channel fails it may be put into a bypass or damped mode permitting the other functioning actuator to maintain control with minimal resistance from the failed channel. Such hydraulic actuators also have a high tolerance of jam failure modes.

There is increased demand for electrification of modern aircraft systems, including electric actuation. There is similarly increased demand for electric actuators in applications outside aerospace. Electric actuators typically use an electric motor driving some form of mechanical gearing, either rotary or linear. Such mechanical mechanisms are often not as tolerant of jam failure modes when compared to hydraulic actuators. Furthermore, complex designs are required to place a failed actuator/channel into a bypass or damped mode, often requiring increased manufacturing difficulty, component count and weight.

Patent application publication U.S. Pat. No. 5,092,539A relates to an actuator for movement between a retracted position and an extended position. The actuator is provided with an inner ball screw drive unit and an outer ball screw drive unit both configured to be operational during a normal stroke. This arrangement provides for limited motion should one of the drive units jam, and can be operated from either end of the actuator.

Accordingly, there is a need to provide a linear actuator that has an improved tolerance to jam failure modes, does not limit stroke in the event of a jam, and that can detect and annunciate jam failure. In addition, if the actuator is operated in an active-standby mode it is desirable to be able to check the standby lane is not latently failed.

SUMMARY OF INVENTION

In order to mitigate at least some of the issues above, there is provided a linear actuator comprising a stroke axis, an actuator rod extending along the stroke axis. The actuator rod comprises: an actuator rod outer surface, and a first screw thread on a portion of the actuator rod outer surface; a sleeve positioned around, and coaxial with, the actuator rod. The sleeve comprises: a sleeve inner surface, a sleeve outer surface, a second screw thread on a portion of the sleeve inner surface, the second screw thread configured to engage with the first screw thread, and a third screw thread on a portion of the sleeve outer surface. A screw nut is provided configured to engage with the third screw thread. At least one motor configured to drive the screw nut. In use, the at least one motor applies a torque to the sleeve via the screw nut. When the applied torque is below a threshold value, the sleeve is restricted from rotating about the stroke axis, such that rotation of the screw nut causes linear displacement of the sleeve and actuator rod together along the stroke axis. When the applied torque equals or exceeds the threshold value, the sleeve is able to rotate about the stroke axis, such that rotation of the screw nut causes rotation of the sleeve, and such that rotation of the sleeve causes linear displacement of the actuator rod.

Advantageously, this arrangement provides a linear actuator (for example that can be actuated by means of one or more electric motors) that has both a normal primary mode/channel of operation and a secondary mode/channel that can be automatically activated in the event of a jam failure condition in the primary mode. For example, the applied torque exceeds the threshold value in the event of a jam condition between the screw nut and the third screw thread.

Optionally the linear actuator further comprises a tube positioned coaxially with the sleeve, the tube rotatable about the stroke axis, wherein the tube is either:

fixed to or part of the sleeve; or comprises an inner tube surface, the inner tube surface comprising at least one axially extending groove, and the sleeve includes at least one axially extending spline configured to engage the at least one axial extending groove, such that the sleeve is free to move axially relative to the tube, and such that rotation of the sleeve causes rotation of the tube. Advantageously this arrangement provides a space efficient basis on which to employ jam failure detection means and/or means for restricting rotation of the sleeve.

Optionally the linear actuator further comprises a detector configured to detect rotation of the sleeve about the stroke axis, wherein the detector is configured to provide signal indicative of a jam or fault condition if rotation of the sleeve about the stroke axis is detected, beneficially annunciating a jam failure between the nut and the sleeve. Optionally the detector is configured to detect rotation of the tube (for example by detecting a change in position of a feature of the tube). Optionally, the tube comprises one or more windows and the detector comprises a proximity sensor positioned proximate to the tube such that the one or more windows pass the sensor during rotation of the tube. Alternatively, or in addition, the detector comprises a rotary position sensor engaged with the tube (for example via gearing engaged with axially oriented teeth or splines on a surface of the tube).

Optionally, the linear actuator further comprises a biasing means and an engaging member, wherein the tube further comprises a detent and the biasing means biases the engaging member in a first position in the detent, so as to resist rotation of the tube when the applied torque is less than the threshold value. When the applied torque meets or exceeds the threshold value, the engaging member is displaced out of the detent to a second position by rotation of the tube. Advantageously this arrangement acts to restrict rotation of the sleeve, such that it only rotates when the applied torque exceeds the threshold, for example under a jam failure condition between the nut and the sleeve.

Optionally, the linear actuator further comprising a latching means, wherein the latching means is configured to retain the engaging member in the second position once the engaging member has been displaced out of the detent, beneficially allowing the sleeve tube and thus the sleeve to rotate freely in a jam failure condition.

Optionally the first screw thread has an axial length that is substantially twice the axial length of third screw thread, thus allowing the linear actuator to extend and retract across a range in secondary mode equivalent to the total range of stroke in primary (non-jammed) mode, regardless of the position of the sleeve relative to the nut if a jam failure occurs.

Optionally a torque required to move the third screw thread relative to the screw nut is less than a torque required to move the second screw thread relative to the first screw thread, such that the sleeve does not rotate about the stroke axis when the applied torque is below the threshold value, thus preventing rotation of the sleeve relative to the actuator rod under normal (e.g., non-jammed) operation.

Optionally the screw nut is ball screw nut, and the first screw thread interacts with the second screw thread directly.

In another aspect of the invention, there is provided an aircraft comprising a fixed structure, a flight control surface and the linear actuator described above, wherein the linear actuator is coupled to the fixed structure and the flight control surface.

BRIEF DESCRIPTION OF THE DRAWINGS

Embodiments of the present invention will now be described, by way of example only, with reference to the following figures in which like reference numerals refer to like features throughout, and in which.

DETAILED DESCRIPTION

The embodiments described below provide a linear actuator with improved jam failure mode tolerance and improved jam fault detection. It will be appreciated that the described actuators may be used in aerospace contexts, for example for flight control surface actuation, as well as in other fields where linear actuation is required.

Figure 1:
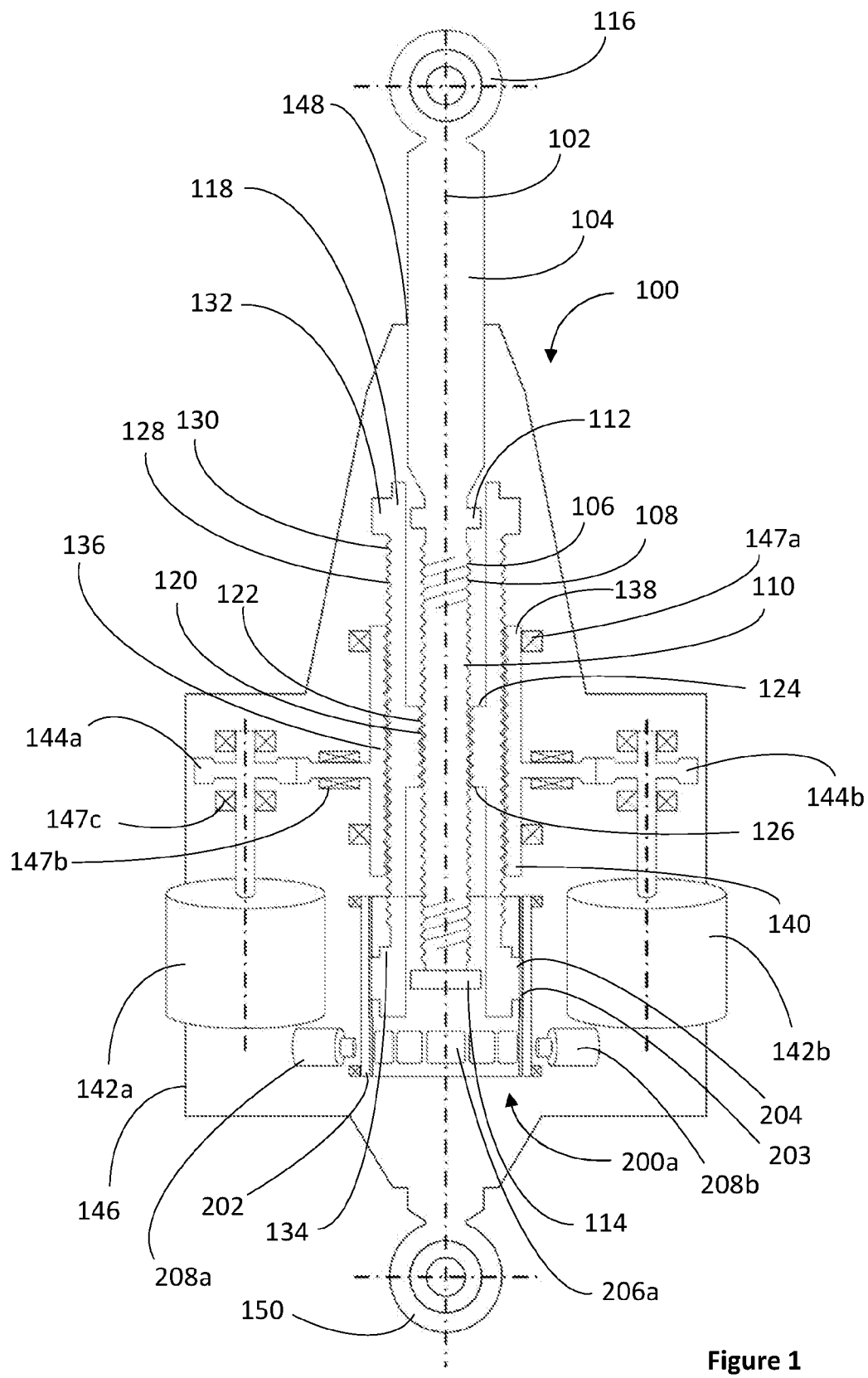
FIG. 1 shows a cross section of a linear actuator in accordance with the present invention part way through a normal stroke.

FIGS. 1 to 5 show cross sections of a linear actuator 100 having a stroke axis 102 (for example a central axis as shown in FIG. 1) and an actuator rod 104 in accordance with an embodiment of the invention under various conditions. The components shown in FIGS. 2 to 5 correspond to those shown in FIG. 1—some reference numerals have been omitted from FIGS. 2 to 5 for clarity of explanation.

The actuator rod 104 is oriented along the stroke axis 102, and comprises a first screw thread 108 extending along an outer surface 106 of the actuator rod 104. As shown the first screw thread 108 extends along a portion 110 of the outer surface 110 of the actuator rod 104, however in other embodiments the first screw thread 108 may extend along substantially the whole length of the outer surface 110.

The actuator rod 104 preferably further comprises a first stop 112 and a second stop 114, each stop 112, 114 optionally being an axial stop formed of an annular flange having an outer diameter larger than the outer diameter of the first screw thread 114. Alternatively torsional stops may be used in place of axial stops.

As shown the actuator rod 104 includes a moving eye assembly 116, though it will be appreciated that the any suitable attachment assembly may be provided, depending on the end use of the actuator 100.

The linear actuator 100 further comprises a sleeve 118 arranged concentrically around at least a portion of the actuator rod 104, and aligned along the stroke axis 102. The actuator sleeve comprises a second screw thread (or nut) 120 on a portion of the inner surface 122 of the sleeve 118, the second screw thread 120 configured to engage with the first screw thread 108 of the actuator rod 104. Rotation of the sleeve 118 relative to the actuator rod 104 causes axial displacement of the sleeve 118 relative to the actuator rod 104. In some embodiments, the second screw thread 120 is a thread having a pitch corresponding to the pitch of the first screw thread, though the pitches may alternatively be different. In alternative arrangements, the second screw thread may be a nut such as a ball screw nut.

The sleeve 118 further comprises a third stop 124 and a fourth stop 126 positioned on the inner surface 122. As shown in FIG. 1, the third and fourth stops 124, 126 are formed from a step change in the inside diameter of the sleeve 118, wherein the sleeve 118 at the second screw thread 120 has a smaller inside diameter than elsewhere along the axial length of the sleeve 118. Under rotation of the sleeve 118 relative to the actuator rod 104 about the stroke axis 102, the maximum axial downwards (in the orientation shown in FIG. 1) displacement of the actuator rod 104 relative to the sleeve 118 is limited by the first stop 112 coming into contact with the third stop 124. Similarly, the maximum axial upwards displacement of the actuator rod 104 relative to the sleeve 118 is limited by the second stop 114 coming into contact with the fourth stop 126.

The sleeve 118 has a third screw thread 128 extending along at least a portion (for example, as shown, a majority) of its outer surface 130. The sleeve further preferably comprises a fifth stop 132 and a sixth stop 134 on its outer surface 130. The fifth and sixth stops 132, 134 are each optionally formed of an annular flange having an outer diameter larger than the outer diameter of the third screw thread 128.

The linear actuator 100 further comprises a nut 136 arranged concentrically around the sleeve 118 and configured to engage with the third screw thread 128. Rotation of the nut 136 relative to the sleeve 118 about the stroke axis 102 causes axial displacement of the sleeve 118 relative to the nut. In the preferred embodiment, the nut is a ball screw nut. In alternative arrangements, the nut 136 may be a simple threaded nut, a rollerscrew nut, and ACME nut, etc.

The nut 136 preferably comprises a seventh stop 138 and an eighth stop 140. Optionally the seventh and eighth stops 138, 140 are formed of ends of the nut 136 as shown in FIG. 1. Under rotation of the nut 136 relative to the sleeve 118 about the stroke axis 102, the maximum axial downwards (in the orientation shown in FIG. 1) displacement of the sleeve 118 relative to the nut 136 is limited by the fifth stop 132 coming into contact with the seventh stop 138. Similarly, the maximum axial upwards displacement of the sleeve 118 relative to the nut 136 is limited by the sixth stop 134 coming into contact with the eighth stop 140.

The nut 136 is driven by two motors 142a, 142b via respective gearing 144a, 144b, such that the nut 136 rotates about the stroke axis 102. It will be appreciated that in alternative embodiments, a single motor, or more than two motors can be provided, for example depending on the drive torque required, package constraints and/or redundancy requirements for the particular application for the actuator 100. For example a plurality of motors can be provided in a torque-sum or speed-sum configuration depending on the intended end use of the actuator. In the preferred embodiment, motors 142a, 142b are electric motors. In alternative examples the motors 142a, 142b are hydraulic motors, or a combination of electric and hydraulic motors. The gearing 144a, 144b may be simple as shown, or complex with more stages for a higher ratio or to suit envelope positioning of the various components.

The linear actuator 100 thus includes a system of nested screw assemblies, wherein the with the nut 136 and the third screw thread 128 of the sleeve 118 cooperate to define an outer screw assembly, and the second screw thread 120 of the sleeve 118 and the first screw thread 108 of the actuator rod 104 cooperate to define an inner screw assembly. Advantageously, the inner screw does not need to be sized for full life requirements of the actuator, since it is operated under jam failure of the outer screw. Accordingly, it can be made to smaller dimensions, than would be required for full life requirements.

The linear actuator 100 preferably further comprises a housing 146, the housing 146 having an opening 148 through which the actuator rod 104 extends. The motors 142a, 142b are fixed within the housing 146. Gearing 144a, 144b and nut 136 are axially and radially constrained by bearings 147a, 147b, 147c connected to the housing 146. As shown, nut 136 is radially constrained by bearings 147a, and axially restrained by thrust bearings 147b respectively. In the illustrated embodiment, the housing 146 also comprises an earth end bearing 150.

The linear actuator preferably further comprises a jam detection assembly 200a, which is described in more detail below.

During operation, the motors 142a, 142b drive respective gearing 144a, 144b, causing the nut 136 to rotate. Under normal operating conditions, friction between the nut 136 and the sleeve 118 is relatively low, and consequently any torque applied to the sleeve 118 by the rotating nut 136 is also relatively low. In contrast, in the event of a jam failure event wherein the nut 136 becomes jammed against the sleeve 118, friction between the nut 136 and the sleeve 118 is high, and the nut 136 being driven by the motors 142a, 142b applies a greater torque to the sleeve 118.

In the present invention, the linear actuator is configured such that rotation of the sleeve 118 about the stroke axis 102 is restricted under normal operating conditions, but permitted in the event of a jam failure.

When the torque applied to the sleeve 118 by the motors 142a, 142 via gearing 144a, 144b and the nut 136 is below a threshold value (e.g., when there is no jam failure condition), the sleeve 118 is prevented from rotating about the stroke axis 102. Under this condition, rotation of the nut 136 about the stroke axis causes translation of the sleeve 118 (either upwards or downwards in the orientation of FIG. 1). In this condition the sleeve 118 and the actuator rod 104 do not rotate relative to each other, thus the actuator rod also translates along the stroke axis with the sleeve 118. Thus, the actuator rod 104 can be extended and retracted through rotation of the nut 136 about the stroke axis.

Figure 2:
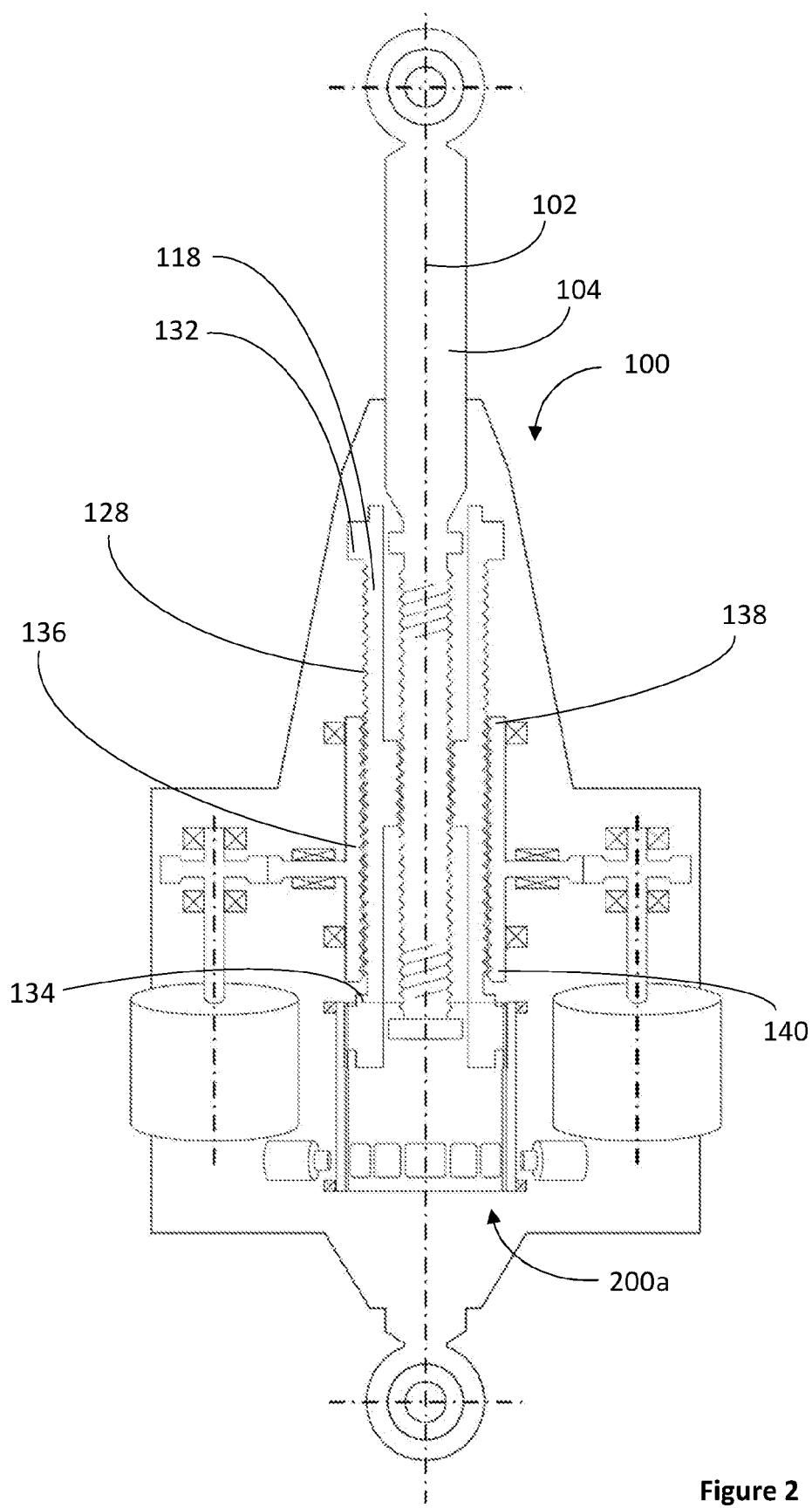
FIG. 2 shows a cross section of the linear actuator of FIG. 1, the linear actuator at an extended end of a normal stroke.
Figure 3:
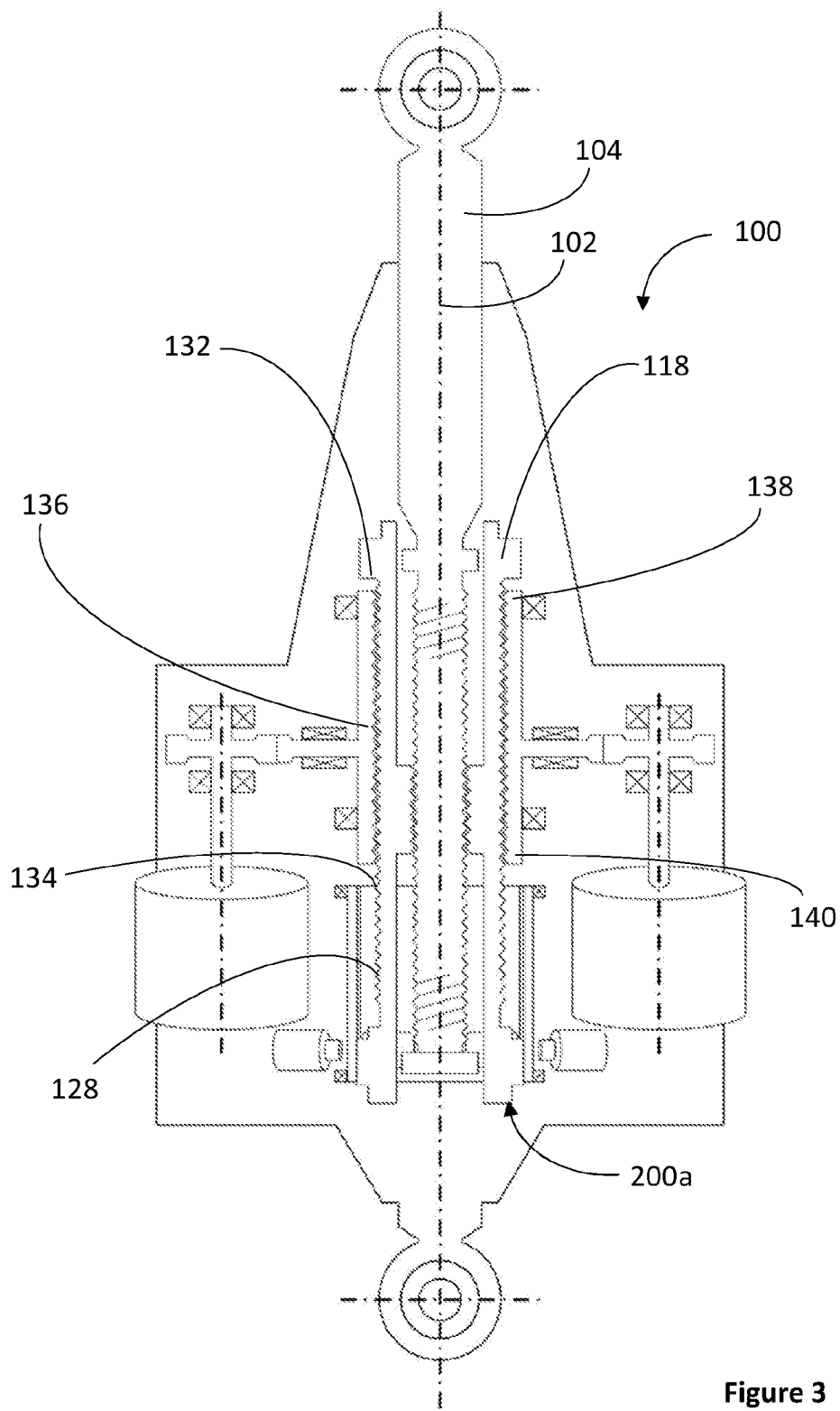
FIG. 3 shows a cross section of the linear actuator of FIG. 1, the linear actuator at a retracted end of a normal stroke.

This is illustrated in FIGS. 2 and 3. FIG. 2 shows the actuator rod 104 near a fully extended end of its stroke under normal operating conditions, that is where the torque applied to the sleeve 118 by the motors 142a, 142 is less than the threshold value. The maximum extension possible is limited by the sixth stop 134 coming into contact with the eighth stop 140. FIG. 3 illustrates the actuator rod 104 near a fully retracted end of its stroke under normal operating conditions. The maximum retraction possible is limited by the fifth stop 132 coming into contact with the seventh stop 138. This defines the normal range of stroke of the actuator rod 104 (that is the range of extensions possible for the actuator rod when the applied torque is less than the threshold value/when there is no jam condition). Under normal operating conditions, there is no displacement between the sleeve 118 and the actuator rod 104, rather the sleeve 118 and actuator rod 104 translate together as the nut 136 rotates.

If the torque applied to the sleeve 118 by the motors 142a, 142 via gearing 144a, 144b and the nut 136 meets or exceeds the threshold value (e.g., if there is a jam failure condition between the nut 136 and the sleeve 118), the sleeve 118 is then able to rotate about the stroke axis 102. Under this condition, rotation of the nut 136 about the stroke axis causes rotation of the sleeve 118 about the stroke axis (for example rotating together). In this condition the sleeve 118 now rotates relative to the actuator rod 104 under rotation of the nut 136, causing the actuator rod 104 to translate along the stroke axis relative to the sleeve 118 (upwards or downwards in the orientation of FIG. 1).

Advantageously, the actuator rod 104 can thus still be extended and retracted through rotation of the nut 136 about the stroke axis, even in the even of the nut 136 becoming jammed with the sleeve 118. The linear actuator 100 is thus effectively provided with a secondary mode/channel in the event of a jam failure event.

Figure 4:
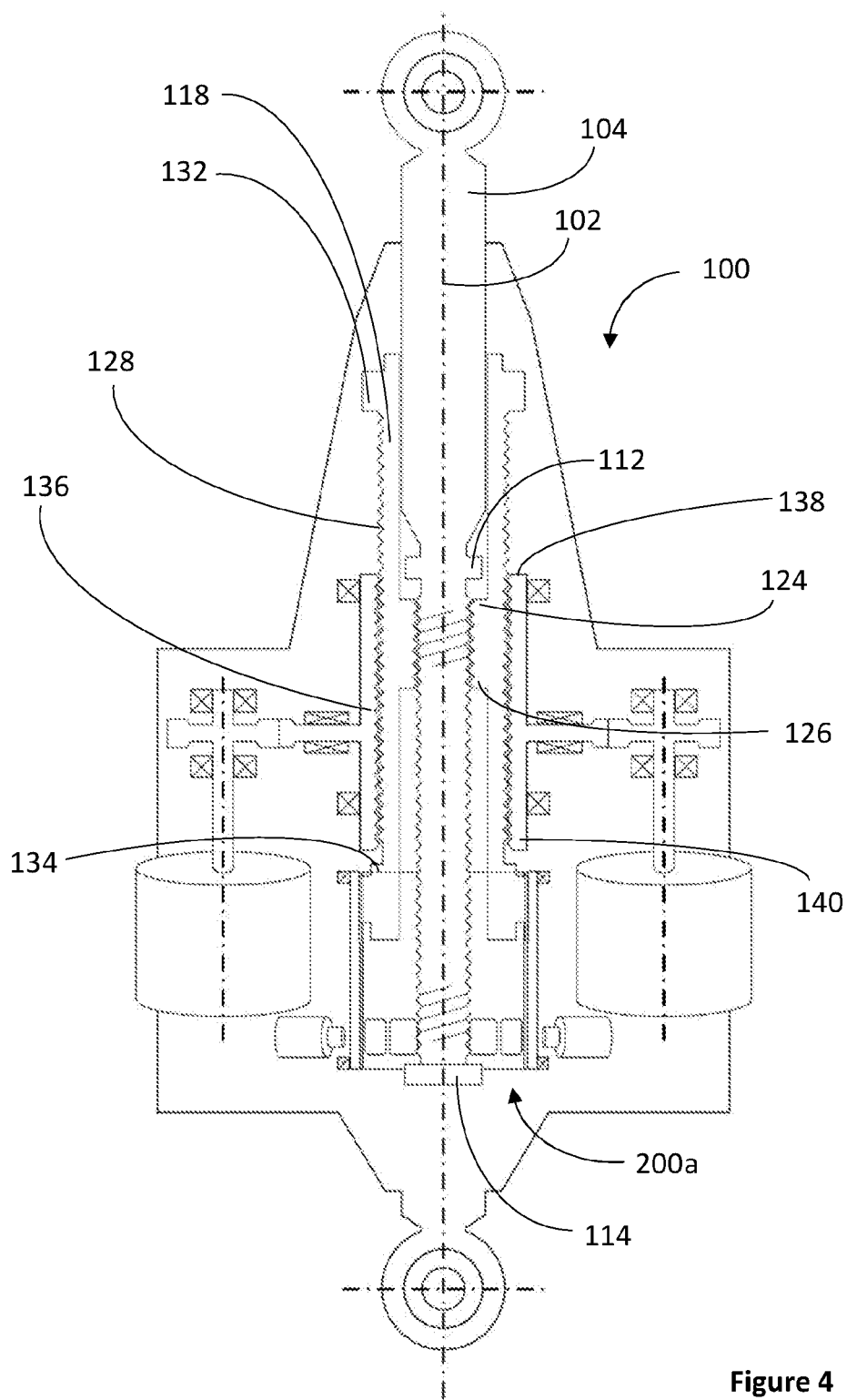
FIG. 4 shows a cross section of the linear actuator of FIG. 1, the linear actuator at a retracted end of a stroke under a jam condition.
Figure 5:
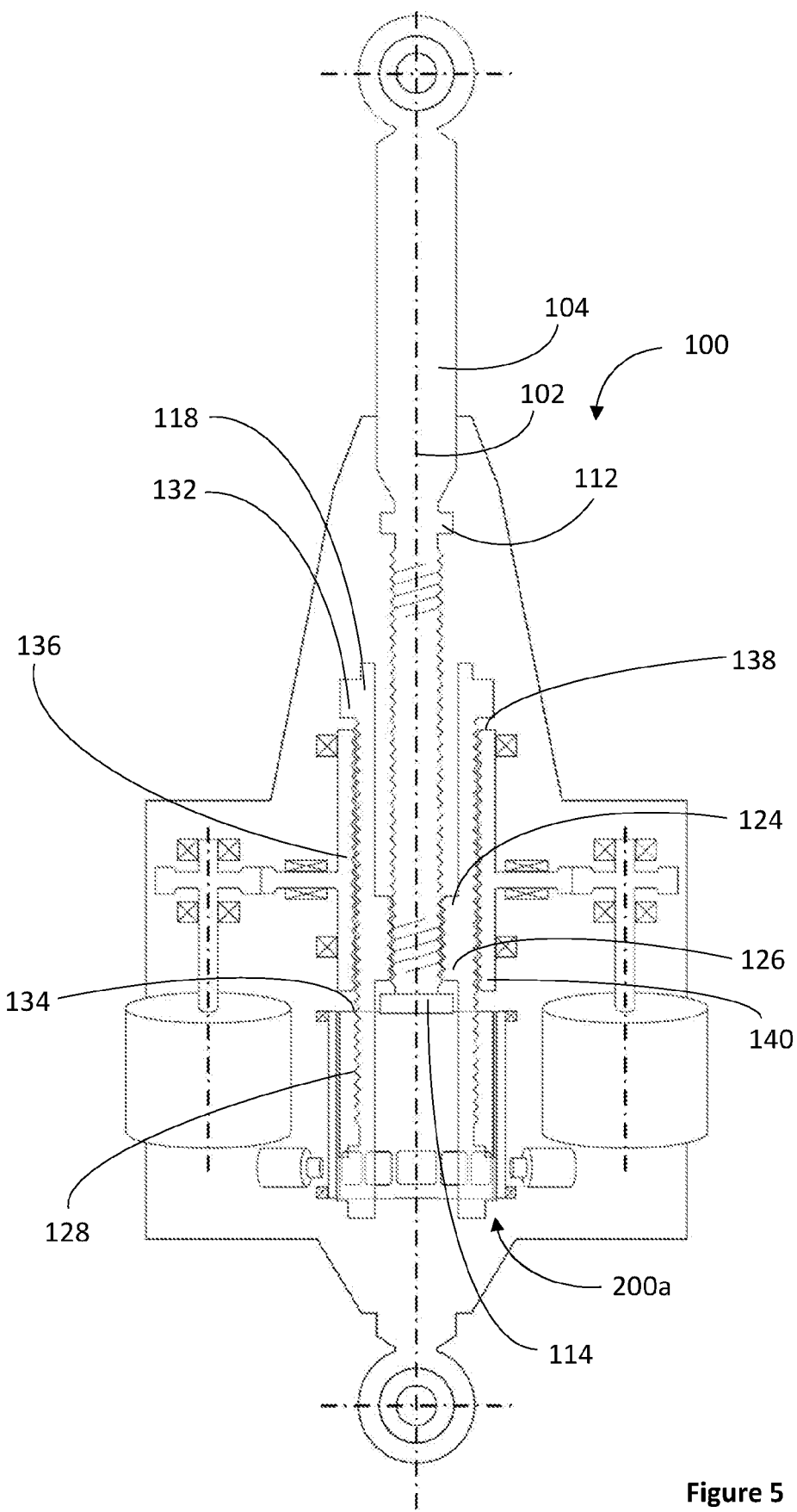
FIG. 5 shows a cross section of the linear actuator of FIG. 1, the linear actuator at an extended end of a stroke under a jam condition.

This is illustrated in FIGS. 4 and 5, which show the linear actuator in the event of a jam between the nut 136 and the sleeve 118, such that the sleeve 118 is unable to translate along the stroke axis, and instead rotates with the nut 136. FIG. 4 shows the actuator rod 104 near a fully retracted end of its stroke under this jam failure condition. The maximum retraction possible in this condition is limited by the first stop 112 coming into contact with the third stop 124. FIG. 5 shows the actuator rod 104 near a fully extended end of its stroke under this jam failure condition. The maximum retraction possible in this condition is limited by the second stop 114 coming into contact with the fourth stop 126.

Preferably, the maximum axial displacement of the actuator rod 104 relative to the sleeve (as determined by the length of the first screw thread 108 and the relative positions of the first, second, third and fourth stops 112, 114, 124, 126) is twice the maximum axial displacement of the sleeve 118 relative to the nut (as determined by the length of the third screw thread 128 and the relative positions of the fifth, sixth, seventh and eighth stops 132, 134, 138, 140). Beneficially, this ensures that the actuator rod 104 is still able to move to any position corresponding to its normal stroke regardless of what position the sleeve 118 is in relative to the nut 136 in the event that a jam occurs. This is also shown in FIGS. 4 and 5: in FIG. 4, the sleeve 118 and nut 136 are jammed such that the sixth stop 134 is proximate to eighth stop 140 and yet the actuator rod 104 can still be placed in a position corresponding to the maximum retraction of the normal range of stroke; in FIG. 5, the sleeve 118 and nut 136 are jammed such that the fifth stop 132 is proximate to seventh stop 138 and yet the actuator rod 104 can still be placed in a position corresponding to the maximum extension of the normal range of stroke.

Various means can be employed to ensure that the sleeve 118 does not rotate about the stroke axis 102 when the torque applied to the sleeve via the nut 136 is less than a threshold amount, and enabling the sleeve 118 to rotate when the applied torque meets or exceeds the threshold. In some embodiments, this is achieved by making the combination of the nut 136 and the third screw thread 128 more efficient than the combination of the first and second screw threads 106, 120, for example by choosing appropriate thread pitches, diameters, and dimensions. Alternatively, or in addition, the nut 138 is a high efficiency device such as a ball screw nut or roller screw nut, such that friction between the nut 138 and the third screw thread 128 is less than the friction between the second screw thread 120 and the first screw thread 106. In alternative embodiments, a detent mechanism can be used (alone or in combination with the techniques above), as described in more detail below.

In the preferred embodiment, the linear actuator 100 includes means for detecting a jam failure between the nut 136 and the sleeve 118. FIGS. 1 to 5 show one example jam detection assembly 200a, comprising a tube 202 oriented about the stroke axis 102 and concentric with the sleeve 118. The tube 202 is rotatable about the stroke axis 102, and is restricted from radial and axial displacement by one or more suitable bearings. In this example, the tube 202 comprises at least one, and preferably a plurality of axially extending slots 203, positioned on the inside surface of the tube 202. The sleeve 118 includes one or more dogs or splines 204 positioned on the outer surface of the sleeve 118 (for example proximate to the sixth stop 134 shown in FIGS. 1 to 5) that slidably fit within corresponding slots 203. The tube 202 further comprises one or more apertures 206a extending radially through the tube 202, and one or more proximity sensors 208a, 208b. As the tube 202 rotates about the stroke axis 102, the one or more apertures 206a follow an annular path. The proximity sensors are held at a fixed position relative to the housing 146, such that they detect the change in position of the one or more apertures 206a as the tube 202 rotates. For example, each proximity sensor 208a, 208b is preferably directed towards the annular path followed by the one or more apertures 206a as the tube 202 rotates, such that during rotation the one or more apertures 206a pass in front of a proximity sensor 208a, 208b. It will be appreciated that alternative means for sensing rotation of the tube 202 could be employed, for example using suitable sensors for detecting other surface features or markings on the tube 202.

Under normal operation of the actuator (that is, when the nut 136 and third screw thread 128 are not jammed, and the torque applied to the sleeve 118 is below the threshold value), the sleeve 118 moves axially under rotation of the nut 136 and the splines 204 slide axially within the slots 203. As the nut 136 rotates, neither the sleeve 118 nor the tube 202 rotate. Accordingly, the apertures 206a remain stationary and the proximity sensors do not detect any change.

If the nut 136 and the third screw thread 128 become jammed (and the torque applied to the sleeve 118 meets or exceeds the threshold), rotation of the nut 136 then causes rotation of the sleeve 118 about the stroke axis 102. In this case, the splines 204 push against the corresponding slots 203, causing the tube 202 to rotate with the sleeve 118. Consequently, the apertures 206a change position, which is detected by the proximity sensors 208a, 208b. The proximity sensors 208a, 208b preferably generate a signal indicative of the jam failure being detected, while the linear actuator 100 can continue to operate in secondary mode as described above. A user (for example a crew member of an aircraft on which the actuator 100 is installed, or an operator of machinery on which the actuator is installed) can thus be informed that the actuator 100 has experienced jam failure and is operating in secondary mode.

Figure 6A:
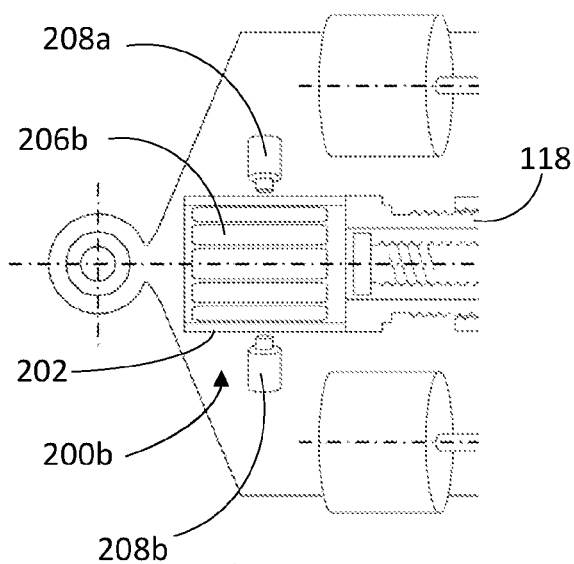
FIGS. 6a to 6c show partial cross sections of the linear actuator of claim 1 employing alternative jam detection means.
Figure 6B:
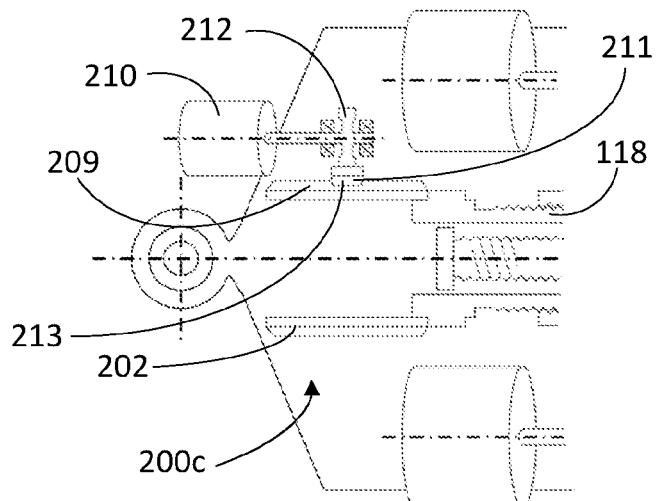
Figure 6C:
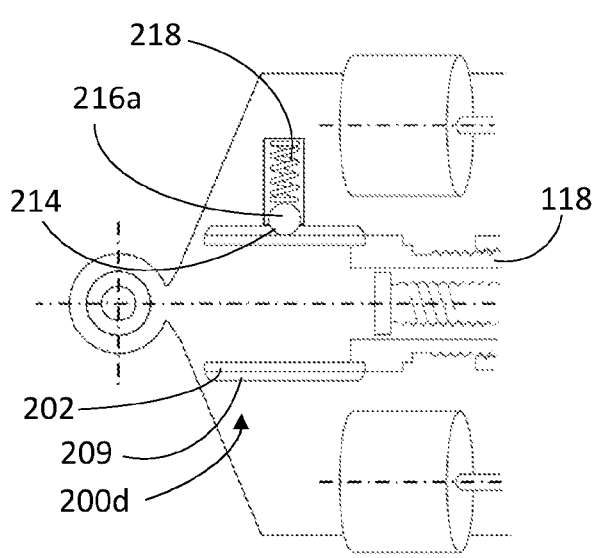

Alternative jam detection assemblies 200b, 200c, 200d are shown in FIGS. 6A to 6C. These can be used in addition to or instead of the jam detection assembly 200a described above in relation to FIGS. 1 to 5.

The jam detection assembly 200b shown in FIG. 6A is similar to the jam detection assembly 200a of FIGS. 1 to 5, employing one or more apertures 206b and proximity sensors 208a, 208b. However, in this example, the tube 202 is fixed to the sleeve 118 or is an integral part the sleeve 118, such that the tube 202 and sleeve 118 move together both in rotation about the stroke axis 102 and in translation along the stroke axis 102. The apertures 206b have an axial length corresponding to at least the full stroke of the actuator when operation in a normal, primary (non-jammed mode). When under normal operation, the sleeve 118, tube 202 and apertures 206b move axially together relative to the position sensors 208a, 208b, however because of the length of the apertures 206a, the position sensors detect the presence (or absence) of an aperture 206a for the entirety of the normal stroke. If the nut 136 and the third screw thread 128 become jammed, both sleeve 118 and tube 202 rotate about the stroke axis, and the proximity detectors 208a, 208b detect changes as the apertures 206b move in an annular direction relative to the proximity sensors. As with the example jam detection assembly 200a described in relation to FIGS. 1 to 5, the proximity sensors 208a, 208b thus provide an indication of the jam failure while the actuator 100 can continue to operate in secondary mode.

A further exemplary jam detection assembly 200c is shown in FIG. 6B. This example is similar to the jam detection assembly 200b shown in FIG. 6A, and includes a tube 202 fixed to the sleeve 118. However, rather than employ apertures and proximity sensors, in this example the tube 202 comprises a plurality of axially extending male teeth/splines 209 on its outer surface (for example evenly spaced male splines 209 positioned around its whole circumference such that the tube 202 defines a hollow cylindrical cog). The jam detection assembly 200c further includes a rotary position sensor 210 (for example a resolver or encoder) fixed with respect to the housing 146 and connected to gearing 212. In this example, the gearing 212 engages with gear teeth on an outer diameter of a ring 211, the ring 211 having female splines 213 on an inside diameter dimensioned to engage with the male splines 209 of the tube 202. When under normal operation, the sleeve 118 and the connected tube 202 move axially, and the teeth 209 slide axially relative to the rotary position sensor 210, ring 211 and gearing 212. The male splines 209 have an axial length such that they remain engaged with the female splines 213 as the sleeve 118 moves through the full extent of its normal stroke. If the nut 136 and the third screw thread 128 become jammed, both sleeve 118 and tube 202 rotate about the stroke axis 102, causing the male splines 209 to move the ring 211 and hence the gearing 212, thereby actuating the rotary position sensor. The rotary position sensor is configured to provide a signal indicative of having detected rotation, thereby annunciating the jam failure. It will be appreciated that, instead of having the tube 202 fixed to the sleeve 118, the sleeve 118 may instead be slidably connected to the sleeve 118 via cooperating axial splines 204 and slots 203 as described above in relation to the exemplary jam detection assembly 200a of FIGS. 1 to 5.

A yet further exemplary jam detection assembly 200d is shown in FIG. 6C. This example is similar to the jam detection assembly 200b shown in FIG. 6B, and includes a tube 202 fixed to the sleeve 118. In this example, the tube 202 includes a detent 216a on its outer surface. As shown, the detent 216a takes the form of a channel between adjacent axial male splines such as the splines 209 described above in relation to FIG. 6B. The jam detection assembly 200d further comprises an engaging member 216a that, under normal operation, is biased against and into the detent 214 by suitable biasing means 218 (for example a spring or other resiliently deformable member). The engaging member 216a is configured to move (e.g., slide or roll) axially relative to the detent 214. The engaging member 216a is also shaped such that, if the tube 202 rotates about the stroke axis 102, the engaging member 216a is displaced out of the detent 214. Also provided is a position sensor (not shown) configured to detect the radial position of the engaging member 216a. Any suitable position sensor known in the art may be used for this purpose. In the illustrated example, the engaging member 216a is a ball bearing, however it will be appreciated other suitable shapes may be provided. When under normal operation, the sleeve 118, tube 202 and detent 214/splines 209 move axially, and the the engaging member 216a slides or rolls along the detent 214. If the nut 136 and the third screw thread 128 become jammed, both sleeve 118 and tube 202 rotate about the stroke axis 102, causing the engaging means to be displaced (upwards relative to the orientation of FIG. 6C). The position sensor detects the change in radial position of the engaging member 216a and is configured to provide a signal indicative of the jam failure.

Advantageously, any of the above jam detection assemblies can also be used to test whether the secondary channel/mode is latently failed. In order to do so, the motors 142a 142b rotate the nut 136 in a given direction (causing the sleeve 118 to translate axially) such that the actuator rod 104 is extended or retracted to an extreme end of its normal range of stroke, when either the fifth stop 132 contacts the seventh stop 138 (maximum retraction) or the sixth stop 134 contacts the eighth stop 140 (maximum extension). The motors 142a, 142b are then instructed to continue rotating in the same direction. If there is no jam failure between the actuator rod 104 and the sleeve 118, then the sleeve 118 rotates with the nut 136 (because the sleeve 118 cannot translate further relative to the nut 136 under continued rotation of the nut), in turn causing the tube 202 to rotate and activating the jam detection assembly 200a, 200b, 200c, 200d. If there is a jam failure between the actuator rod 104 and the sleeve 118, then it is not possible to rotate the nut 136, sleeve 136 or tube any further, and the jam detection assembly 200a, 200b, 200c, 200d is not activated and the extra overtravel stroke corresponding to the actuator rod 104 moving axially relative to the sleeve 118 cannot be reached. Therefore, the absence of a signal from the jam detection assembly 200a, 200b, 200c, 200d when performing this procedure indicates latent failure of the secondary mode/channel. In use, this test for latent failure may be performed periodically.

Advantageously, the jam detection means 200a, 200b, 200c, 200d can thus be used to detect failure of both the primary and secondary channels/modes.

FIGS. 7A to 7D illustrate various detent mechanisms configured to prevent rotation of the sleeve 118 when the applied torque is less than the threshold value. These mechanisms provide a particularly effective means for ensuring that the bypass channel of the linear actuator 100 is only operated when necessary.

Figure 7A:
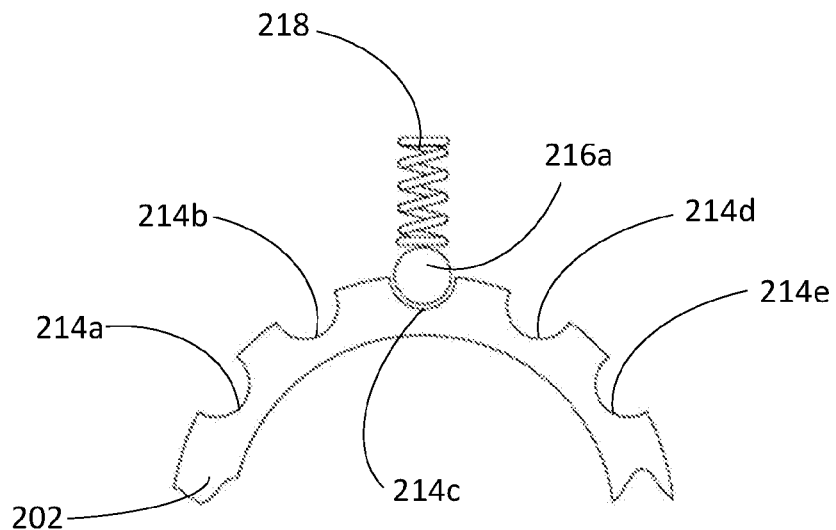
FIGS. 7a to 7d show partial cross sections of various mechanisms for restricting rotation of a sleeve in accordance with embodiments of the present invention.

FIG. 7A show a partial cross section of the tube 202 (which optionally also forms part of one or more of the jam detection assemblies 200a, 200b, 200c, 200d described above). The tube 202 includes one or more detents (for example axial slots) 214a, 214b, 214c, 214d, 214e positioned on its radially outer surface. Similar to the jam detection assembly 200d as described above in relation to FIG. 6C, the actuator 100 comprises an engaging member 216a that, under normal operation, is biased against and into one of the detents 214a, 214b, 214c, 214d, 214e by suitable biasing means 218 (for example a spring or other resiliently deformable member). The engaging member 216a and detents 214a, 214b, 214c, 214d, 214e are shaped such that they interact to resist rotation of the tube 202 and hence rotation of the sleeve 118 about the stroke axis, but such that the engaging member 216a is displaced from a respective detent 214a, 214b, 214c, 214d, 214e when the tube 202 is subjected to sufficient torque. Consequently, when the torque applied to the sleeve 118 by the motors 142a, 142b via the nut 136 is below the threshold value, insufficient torque is transmitted to the tube 202 to displace the engaging member 216a, and as a result the tube 202 and the sleeve 118 do not rotate about the stroke axis 102. When the torque applied to the sleeve 118 at or above the threshold value (e.g., if the nut 136 and sleeve 118 have jammed), sufficient torque is transmitted to the tube 202 to displace the engaging member 216a out of the respective detents 214a, 214b, 214c, 214d, 214e (upwards relative to the orientation of FIG. 7A), at which point the tube 202 and sleeve 118 are able to rotate about the stroke axis 102.

As shown in FIG. 7A, a plurality of detents 214a, 214b, 214c, 214d, 214e are provided, such that the engaging means 216a can engage with other detents 214a, 214b, 214d, 214e after being displaced from a first detent 214c. Alternatively, a single detent 214 may be provided.

Figure 7B:
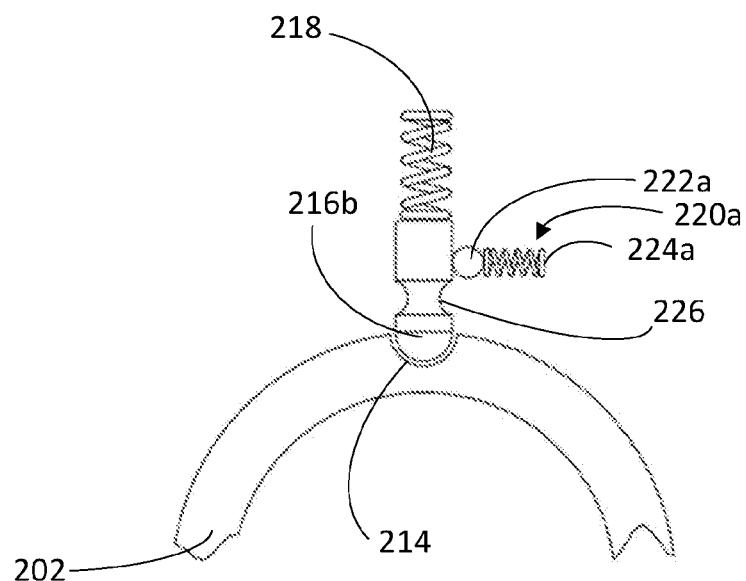

FIG. 7B shows a similar arrangement that operates on the same principle as that of FIG. 7A. In this example, the tube 202 comprises a single detent 214, and the detent mechanism is latching so as to permit free rotation of the tube 202 after the engaging member 216b has been initially displaced from the detent 214. In this example, a latching member 220a is provided, comprising a latch 222a (e.g., a ball bearing) and a latch biasing means 224a (e.g., a spring or other resiliently deformable member) that biases the latch 222a against the engaging member 216b. The engaging member includes a socket 226 configured to receive the latch 222a. Under normal operating conditions, the engaging member 216a is biased against and into the detent 214, and the socket 226 and latch 222a are misaligned such that the latch is biased against a side of the engaging member 216b. When a torque is applied to the sleeve 118 that meets or exceeds the threshold (e.g., in the event of a jam failure between the nut 136 and the sleeve 118), sufficient torque is transmitted to the tube 202 from the sleeve 118 to displace the engaging member 216b from the detent 214. When the engaging member 216b is displaced, the socket 226 is aligned with the latch, and the latch 222a is urged into the socket 226 by the latch biasing means 224a. Thereafter the engaging means 216b is prevented from moving further by the latch 222a, and the tube 202 (and hence sleeve 118) is free to rotate about the stroke axis without the engaging member 216b re-engaging with the detent 214. Beneficially, this latching arrangement reduces drag and wear on the tube 202.

Figure 7C:
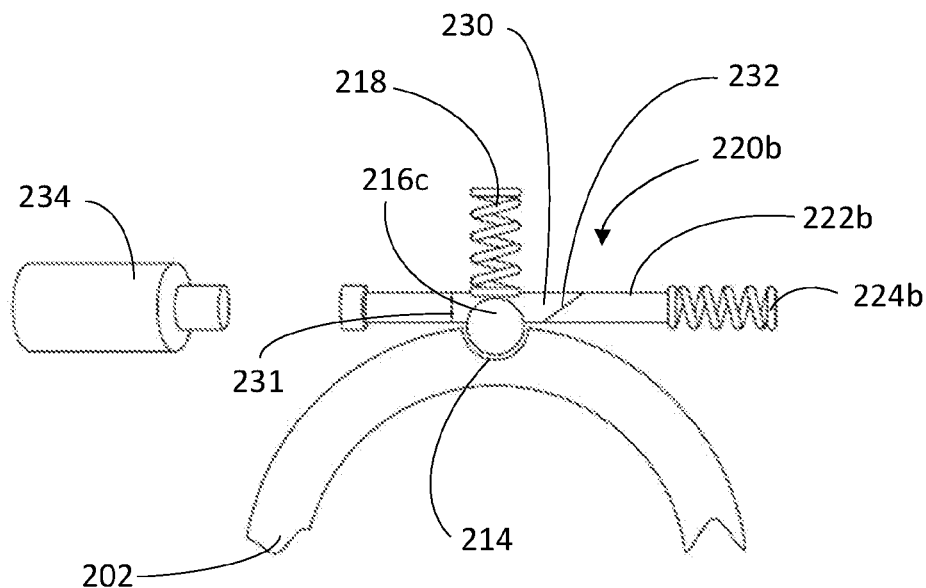
Figure 7D:
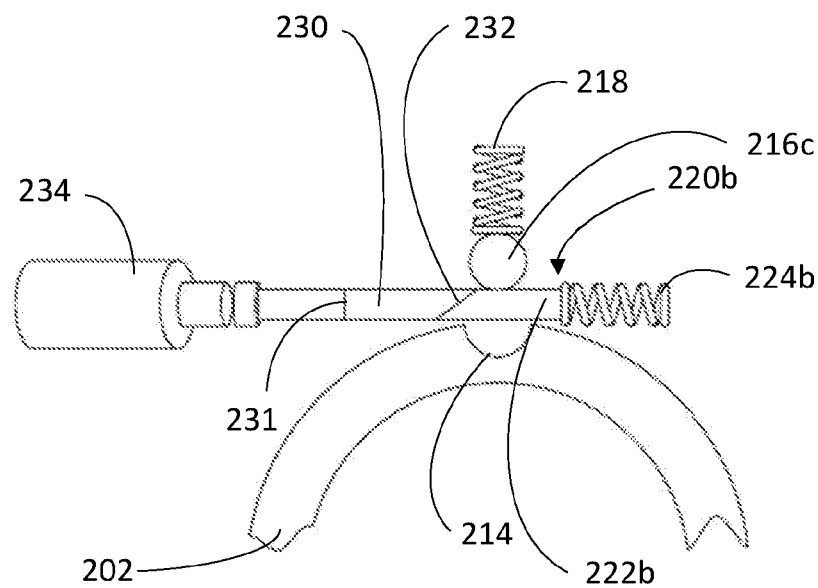

FIGS. 7C and 7D shows a detent mechanism operating on the same principle as that shown in FIG. 7B, but employing an alternative latching means 220b. In this example, the tube 202 again comprises a detent 214 into which an engaging member 216c is urged by biasing means 218 under normal operation. A latch 222b is provided having an opening or cutaway section 230. The opening has a first side 231 and a second side 232 defining a ramp portion 232. The latch 222b is biased by latch biasing means 224b. The arrangement also comprises a proximity sensor 234 configured to detect the relative position of the latch 222b.

FIG. 7C shows the situation under normal operation, that is, when the nut 136 is not jammed against the sleeve 118. The engaging member 216c is biased into the detent 214 by the biasing means 218. The engaging member 216c extends through the opening 230, and the latch 222b (specifically the second side 232) is biased against the engaging member 216c by the latch biasing means 224b. The engaging member 216c holds the latch 222b in a first location away from the proximity sensor 234.

FIG. 7D shows the situation if the nut 136 becomes jammed against the sleeve 118, and the torque applied to the sleeve 118 exceeds the threshold, causing rotation of the tube 202 and displacement of the engaging means 216c out of the detent 214. The ramped shape of the second side 232 and the shape of the engaging means 216c in combination are such that, when the engaging means 216c is displaced out of the detent 214 by rotation of the tube 202, the ramp of the second side 232 pushes the engaging means away from the tube 202 under the force from the latch biasing means 224b. The body of the latch 222b then passes between the engaging means 216c and the tube 202, towards the proximity sensor 234, thus retaining the engaging means 216c and allowing the tube 202 to rotate freely. In addition, the proximity sensor 234 registers the change in position of the latch 222b, providing an alternative/additional means for detecting and annunciating the jam failure condition between the sleeve 118 and the nut 136.

In the particular example illustrated in FIGS. 7C and 7D, the engaging means 216c is a ball, wherein a majority of the ball is located radially closer to the stroke axis 102 than the end of the ramp on the second side 232 when the ball is fully engaged with the detent 214. On rotation of the tube 202, the ball is displaced such that a majority of the ball is located radially further from the stroke axis than the end of the ramp of the second side 232, thereby allowing the ball to ride up the ramp as the latch 222b moved generally towards the proximity detector 234. It will be appreciated that other shapes of both ramped second side 232 and engaging means 216c could be provided to achieve the same effect.

Figure 8:
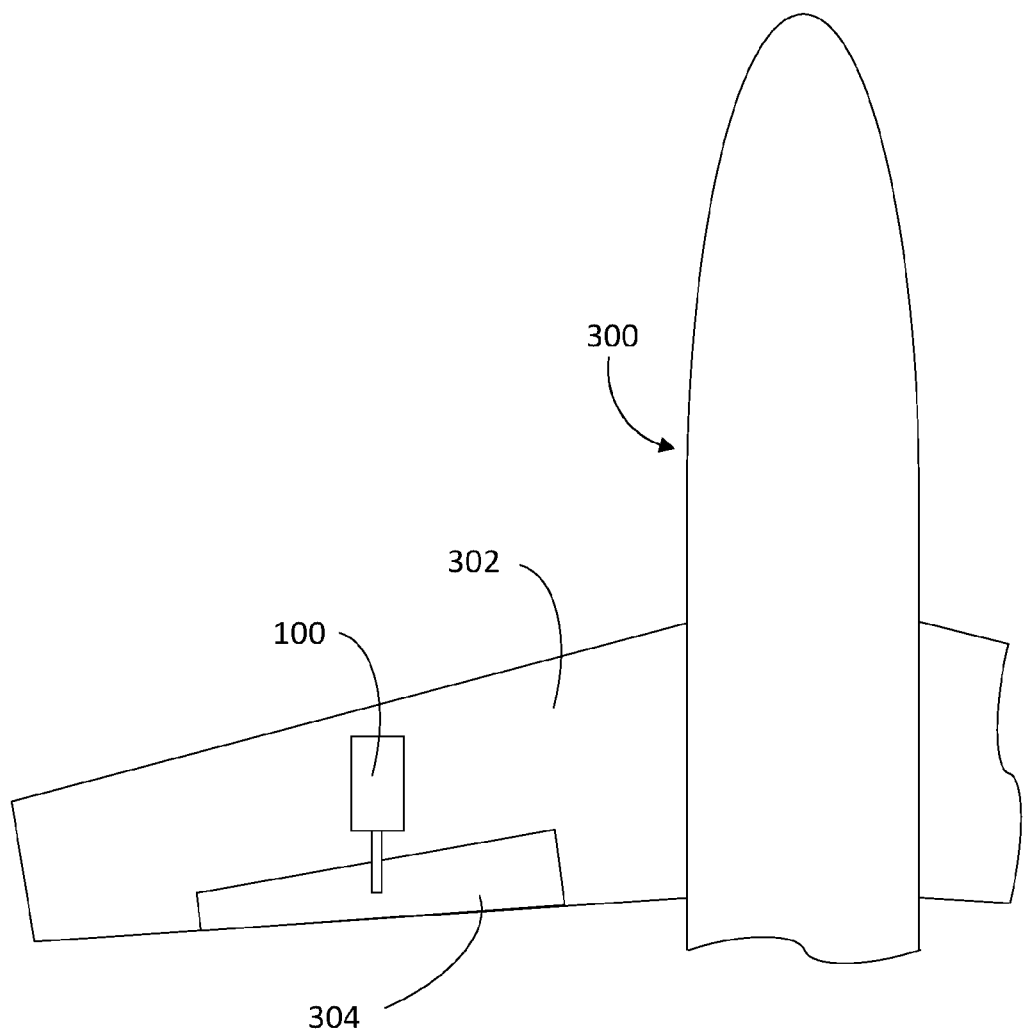
FIG. 8 shows a schematic partial plan view of an aircraft employing the linear actuator of FIG. 1.

FIG. 8 shows a schematic view of an aircraft 300 comprising a fixed structure 302 (for example a fixed part of a wing) and a flight control surface 304 (for example a flap, slat, aileron, etc.), and employing the linear actuator 100 described above. The linear actuator is connected to both the fixed structure 302 and the flight control surface 304, such that when operated, the actuator 100 moves the flight control surface 304 relative to the fixed structure 302.

The above embodiments are non-limiting and provided as examples only. The scope of the invention is as set out in the appended independent claims. Further aspects of the invention will be understood from the appended claims.

The invention claimed is:

1. A linear actuator comprising:
   a stroke axis;
   an actuator rod extending along the stroke axis, the actuator rod comprising:
   an actuator rod outer surface, and
   a first screw thread on a portion of the actuator rod outer surface;
   a sleeve positioned around, and coaxial with, the actuator rod, the sleeve comprising:
   a sleeve inner surface,
   a sleeve outer surface,
   a second screw thread on a portion of the sleeve inner surface, the second screw thread configured to engage with the first screw thread, and
   a third screw thread on a portion of the sleeve outer surface;
   a screw nut configured to engage with the third screw thread;
   at least one motor configured to drive the screw nut;
   wherein, in use, the at least one motor applies a torque to the sleeve via the screw nut; and
   when the applied torque is below a threshold value, the sleeve is restricted from rotating about the stroke axis, such that rotation of the screw nut causes linear displacement of the sleeve and actuator rod together along the stroke axis;
   when the applied torque equals or exceeds the threshold value, the sleeve is able to rotate about the stroke axis, such that rotation of the screw nut causes rotation of the sleeve, and such that rotation of the sleeve causes linear displacement of the actuator rod.

2. The linear actuator of claim 1, wherein the applied toque exceeds the threshold value in the event of a jam condition between the screw nut and the third screw thread.

3. The linear actuator of claim 1, further comprising a tube positioned coaxially with the sleeve, the tube rotatable about the stroke axis, wherein:
   the tube comprises an inner tube surface, the inner tube surface comprising at least one axially extending groove;
   the sleeve includes at least one axially extending spline configured to engage the at least one axial extending groove, such that the sleeve is free to move axially relative to the tube, and such that rotation of the sleeve causes rotation of the tube.

4. The linear actuator of claim 1, further comprising a detector configured to detect rotation of the sleeve about the stroke axis, wherein the detector is configured to provide a signal indicative of a jam or fault condition if rotation of the sleeve about the stroke axis is detected.

5. The linear actuator of claim 1, further comprising a detector configured to detect rotation of the sleeve about the stroke axis, wherein the detector is configured to provide signal indicative of a jam or fault condition if rotation of the sleeve about the stroke axis is detected, wherein the detector is configured to detect rotation of the tube.

6. The linear actuator of claim 5, wherein:
   the tube comprises one or more windows; and
   the detector comprises a proximity sensor positioned proximate to the tube such that the one or more windows pass the sensor during rotation of the tube.

7. The linear actuator of claim 5, wherein the detector comprises a rotary position sensor engaged with the tube.

8. The linear actuator of claim 3, further comprising a biasing means and an engaging member, wherein:
   the tube further comprises a detent;
   the biasing means biases the engaging member in a first position in the detent, so as to resist rotation of the tube when the applied torque is less than the threshold value; and when the applied torque meets or exceeds the threshold value, the engaging member is displaced out of the detent to a second position by rotation of the tube.

9. The linear actuator of claim 8, further comprising a latching means, wherein the latching means is configured to retain the engaging member in the second position once the engaging member has been displaced out of the detent.

10. The linear actuator of claim 1, wherein the first screw thread has an axial length that is substantially twice the axial length of the third screw thread.

11. The linear actuator of claim 1, wherein a torque required to move the third screw thread relative to the screw nut is less than a torque required to move the second screw thread relative to the first screw thread, such that the sleeve does not rotate about the stroke axis when the applied torque is below the threshold value.

12. The linear actuator of claim 1, wherein the screw nut is a ball screw nut or a roller screw nut, and the first screw thread interacts with the second screw thread directly.

13. An aircraft comprising:
a fixed structure;
a flight control surface; and
the linear actuator of claim 1;
wherein the linear actuator is coupled to the fixed structure and the flight control surface.

\* \* \* \* \*